United States Patent
Zimmer et al.

(10) Patent No.: US 8,931,156 B1
(45) Date of Patent: Jan. 13, 2015

(54) PULLER FOR PULLEY OF SUPERCHARGER

(71) Applicant: ZPE Licensing Inc., Temecula, CA (US)

(72) Inventors: Andrew Jason Zimmer, Temecula, CA (US); Jason Edelman, Simi Valley, CA (US)

(73) Assignee: ZPE Licensing Inc.

( * ) Notice: Subject to any disclaimer, the term of this patent is extended or adjusted under 35 U.S.C. 154(b) by 0 days.

(21) Appl. No.: 14/251,306

(22) Filed: Apr. 11, 2014

(51) Int. Cl.
- *B23P 19/04* (2006.01)
- *B25B 27/02* (2006.01)
- *B21D 53/26* (2006.01)

(52) U.S. Cl.
CPC ............. *B25B 27/023* (2013.01); *B21D 53/261* (2013.01)
USPC ... 29/426.1; 29/426.5; 29/525.01; 29/525.11; 29/256; 29/270

(58) Field of Classification Search
CPC ... B25B 27/023; B21D 53/261; B23P 11/027; B23P 19/033; B23P 18/047; B23P 19/067
USPC .......... 29/426.1, 426.5, 525.01, 525.11, 244, 29/256, 258, 267, 270, 255, 259, 271
See application file for complete search history.

(56) References Cited

U.S. PATENT DOCUMENTS

| | | | | |
|---|---|---|---|---|
| 3,078,556 | A * | 2/1963 | Carroll | 29/226 |
| 3,599,311 | A * | 8/1971 | Ellis | 29/239 |
| 4,034,458 | A * | 7/1977 | Ford et al. | 29/259 |
| 6,266,860 | B1 * | 7/2001 | Kiebler | 29/259 |
| 7,520,041 | B1 * | 4/2009 | Aguilar | 29/259 |
| 7,996,972 | B2 * | 8/2011 | Hu | 29/252 |
| 2009/0313799 | A1 * | 12/2009 | Oguri | 29/264 |
| 2011/0126394 | A1 * | 6/2011 | Heimmer | 29/426.2 |

OTHER PUBLICATIONS

Steeda Autosports, http://www.steeda.com/steeda-gt500-super-charger-pulley-puller-555-8902/.
VMP Tuning, http://vmptuning.com/tools/3inclam/.
VMP Tuning, http://vmptuning.com/pulley-tools/vmpalltool/.

* cited by examiner

*Primary Examiner* — Jermie Cozart
(74) *Attorney, Agent, or Firm* — Stetina Brunda Garred & Brucker

(57) ABSTRACT

A puller for removing a pulley off of the shaft is disclosed. The puller may have proximal and distal plates that are disposable around the pulley so that the pulley is disposed entirely between the proximal and distal plates. These plates are held together by frame members. A push rod is threadably engaged to a proximal plate and operative to be further inserted into the proximal plate so that a distal end of the push rod may push against the shaft and transfer a removing force through the puller to the backside of the pulley for removing the pulley off of the shaft.

11 Claims, 5 Drawing Sheets

PULLER FOR PULLEY OF SUPERCHARGER

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various embodiments and aspects discussed herein relate to a puller for removing a pulley off of a shaft.

In an automobile engine, a number of pulleys are mounted to a shaft and utilized to transfer rotational motion from a first shaft to a second shaft. The first and second shafts are connected to each other with the belt. After a period of time, the pulley must be replaced or fixed. To do so, the pulley must be removed from the shaft. However, due to the tight spacing requirements of the engine, it is often difficult to remove the pulley without significant labor and expense. In certain instances, a number of other parts must be removed before the pulley to be fixed or replaced can be removed from the shaft.

Accordingly, there is a need in the art for an improved puller for removing a pulley off of a shaft.

BRIEF SUMMARY

A puller having proximal and distal plates and frame members that hold the proximal and distal plates together is disclosed. The distance between the proximal and distal plates may be adjusted so that the pulley may be disposed entirely between the proximal and distal plates during the removal process. A push rod is threadably engaged to a proximal plate and centered with respect to the frame members. The push rod engages the shaft as the push rod is rotated into the proximal plate. In this manner, force is transferred from the push rod to the proximal plate, through the frame members and the distal plate and ultimately to a distal end of the pulley.

More particularly, a puller for removing a pulley mounted to a shaft of a supercharger is disclosed. The puller may comprise a distal plate, a proximal plate, elongate frame members and a push rod. The distal plate may have an opening sufficiently large to receive the shaft and a portion of the super charger where the shaft is mounted to the portion of the supercharger. The opening may be smaller than a distal end of the pulley so that the distal plate can engage the distal end of the pulley to apply a force to the distal end of the pulley. The first plate may have three attachment points disposed about a central axis of the puller.

The proximal plate may have three attachment points disposed about the central axis of the puller. The attachment points of the proximal plate may be in alignment with the attachment points of the distal plate. The proximal plate may have a threaded hole axially aligned to the central axis of the puller.

The three elongate frame members may define distal and proximal end portions. The distal end portions of the three frame members may be attached (e.g., threaded engagement) to the three attachment points of the distal plate. The proximal end portions of the three frame members may be attached (e.g., sliding engagement) to the three attachment points of the proximal plate.

The push rod may be threadably engaged to the threaded hole of the proximal plate. The push rod may have a wrench engaging portion for rotating the push rod and a distal portion sized and configured to engage a proximal end of the shaft of the supercharger.

In use, clockwise rotation of the push rod traverses the distal portion of the push rod into engagement with the proximal end of the shaft of the super charger and creates an opposing force on the distal end of the pulley with the distal plate to pull the pulley off of the shaft of the super charger.

The distal and proximal plates may each have three attachment points spaced apart 120 degrees about the central axis. The distal and proximal plates may have two, four or more attachment points spaced apart equally about a central axis of the puller.

The frame members may be bolts. The attachment points of the distal plate may be threaded holes engaging a threaded portion of the bolts. The attachment points of the proximal plate are through holes engaging a neck portion of the bolts. One of the frame members closest to the opening of the distal plate may be removably attachable to the distal plate.

The threaded hole of the proximal plate may comprise a recess formed on a distal side of the proximal plate and an insert with the threaded hole. The insert may be retained within the recess.

The distal portion of the push rod may be independently rotatable with respect to the wrench engaging portion.

In another aspect, a method of removing a pulley mounted on a shaft of a supercharger is disclosed. The method may comprise the steps of inserting the pulley between proximal and distal plates of a puller; inserting the shaft and a portion of the supercharger where the shaft is mounted into an opening of a distal plate of the puller; rotating a push rod attached to a proximal plate of the puller; engaging a distal portion of the push rod with a proximal end of the shaft; and pushing the pulley off of the shaft with the distal plate.

In the method, the pushing step may include the step of applying a force to a distal end of a body of the pulley to remove the pulley off of the shaft.

The method may further comprise the steps of removing an elongate frame member from the distal plate of the puller; and attaching the removed frame member onto the distal plate of the puller.

The method may also further comprise the step of maintaining a distal portion of the push rod in a stationary position when the distal portion of the push rod is in contact with the shaft and a threaded portion of the push rod is being rotated.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
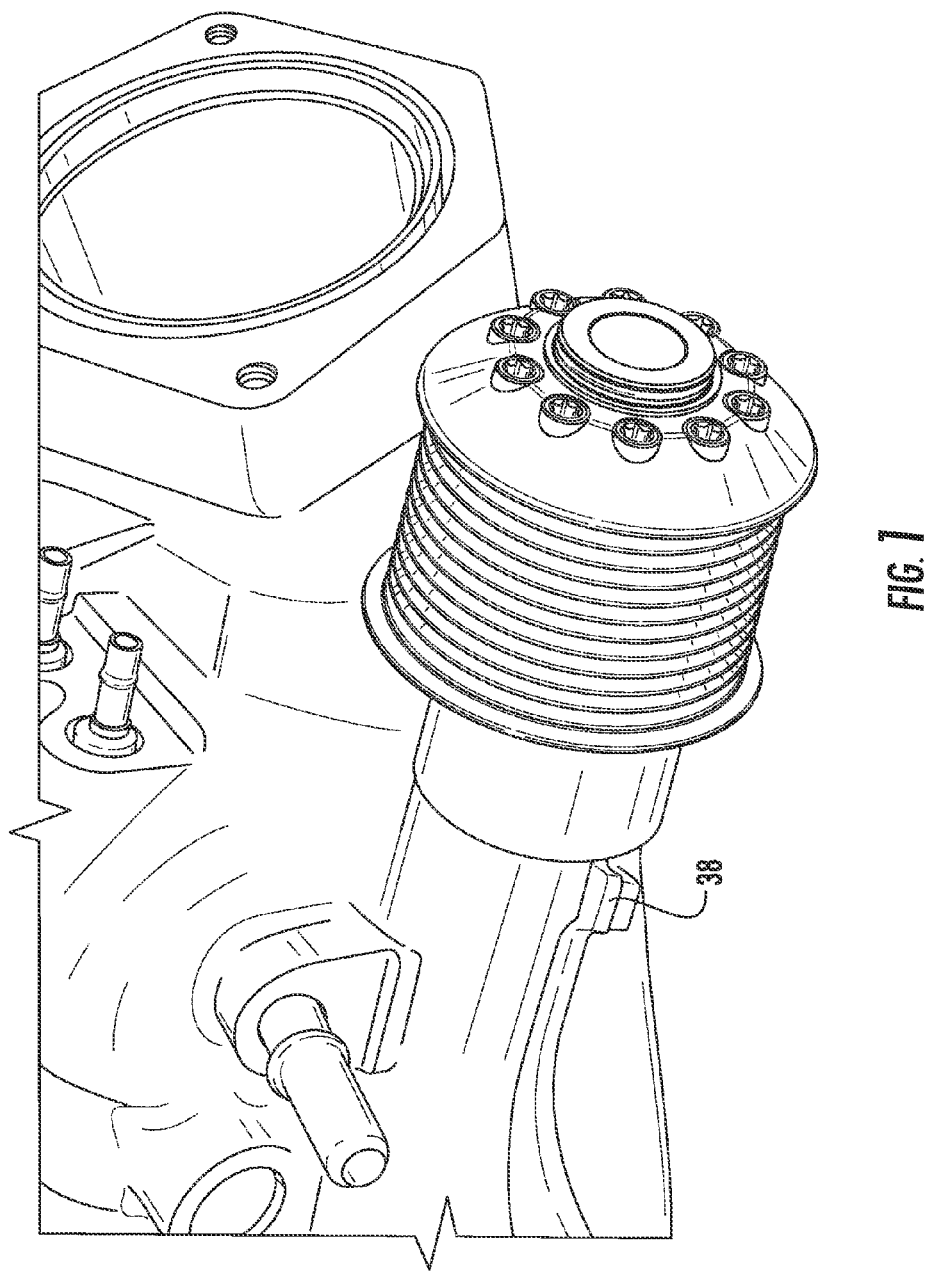
FIG. 1 is a perspective view of a supercharger with a pulley mounted to a shaft of the supercharger.
Figure 2:
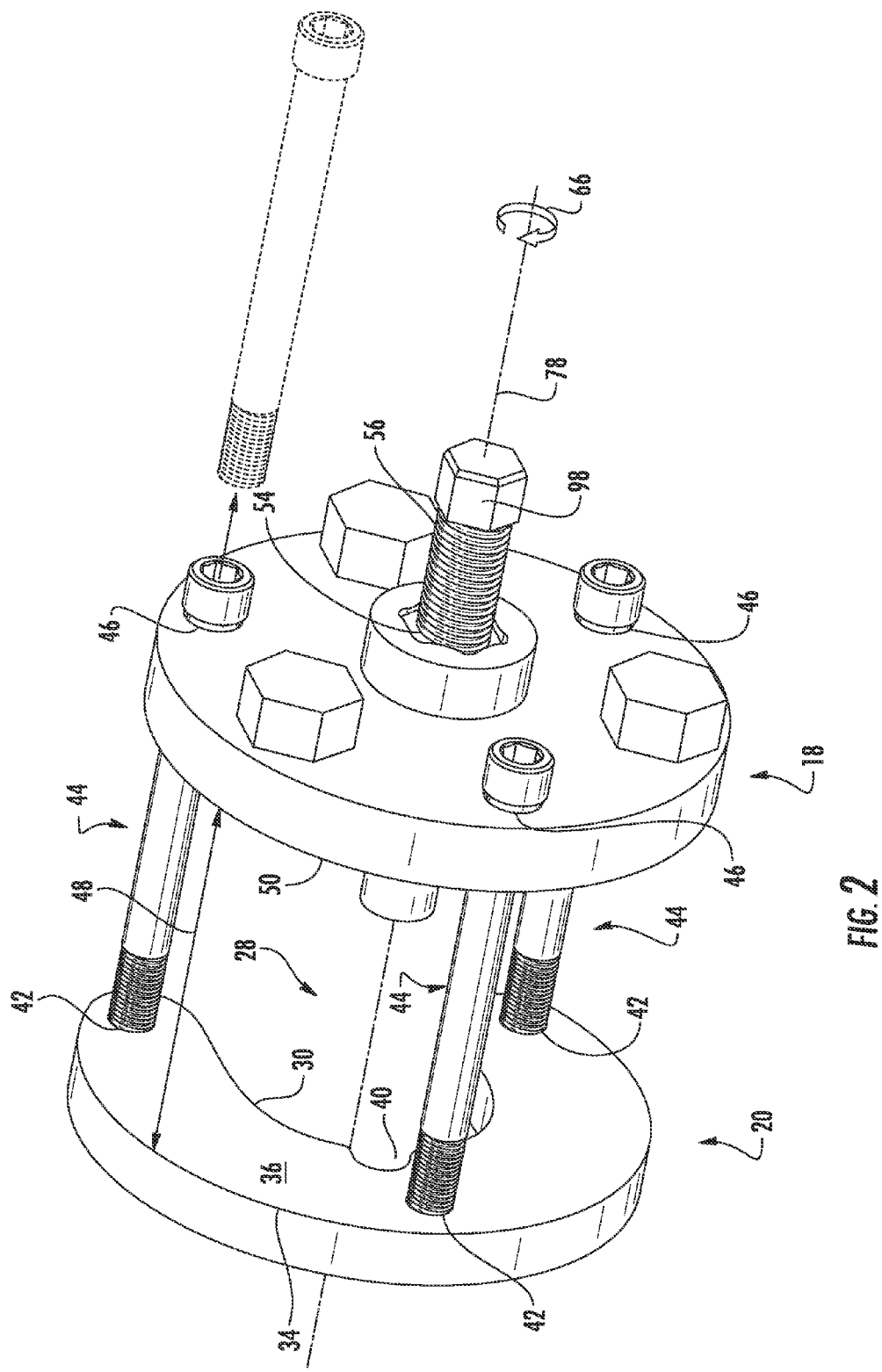
FIG. 2 is a perspective view of a puller for removing the pulley mounted to the shaft of the supercharger shown in FIG. 1.

Referring now to the drawings, a puller 10 for removing a pulley 12 off of a shaft 14 of the supercharger 16 is shown.

The puller 10 may have proximal and distal plates 18, 20. The pulley 12 is placed between the proximal and distal plates 18, 20. The distal plate 20 engages a distal end 22 of the pulley 12. A pushrod 24 is threadably engaged to the proximal plate 18 so that upon rotation of the pushrod 24, a distal portion 26 of the pushrod 24 pushes upon the shaft 14 of the supercharger 16 which in turn applies a force to the distal end 22 of the pulley 12 with the distal plate 20 to remove the pulley 12 off of the shaft 14.

More particularly, the proximal and distal plates 18, 20 may be spaced apart and positioned parallel to each other. The distal plate 20 may have a C-shaped configuration defining an opening 28. The inner periphery 30 of the opening 28 is smaller than the outer periphery 32 of the pulley 12, whereas an outer periphery 34 of the distal plate 20 is larger than the outer periphery 32 of the pulley 12. In this manner, the distal end 22 of the pulley 12 can engage a proximal side 36 of the distal plate 20 during removal of the pulley 12 from the shaft 14.

Figure 3:
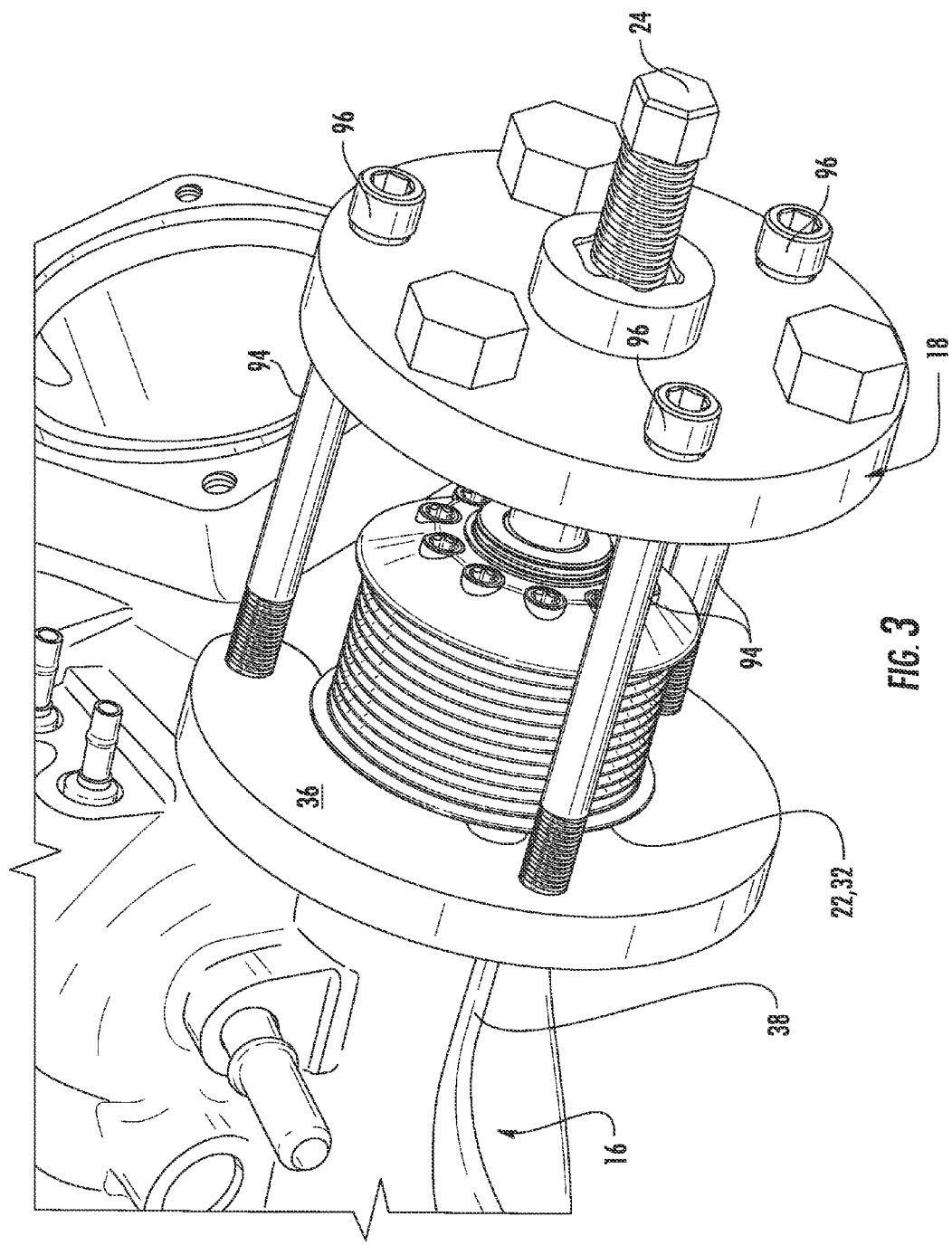
FIG. 3 is a perspective view of the puller and the supercharger wherein the puller is mounted to the pulley to be removed.

The distal plate 20 may be configured to fit behind the pulley 12 when the pulley 12 is mounted to the shaft 14 of the supercharger 16. In particular, the inner periphery 30 of the distal plate 20 may be configured to fit around a portion of the supercharger 16 holding the shaft 14. As shown in FIG. 3, the portion of the supercharger 16 holding the shaft 14 may have a ridge 38. The ridge 38 may protrude out from the normal envelope of the supercharger 16. To accommodate the ridge 38, the distal plate 20, and more particularly, the inner periphery 30 of the opening 28 of the distal plate 20 may have a cutout 40 for accommodating the ridge 38 so that the proximal side or surface 36 of the distal plate 20 may support the distal end 22 of the pulley 12. Other configurations of the inner periphery 30 of the opening 28 are also contemplated for the purposes of accommodating other features of a part that holds the shaft 14 on which the pulley 12 is mounted to.

The distal plate 20 may also have two or more attachment points 42. Preferably, the distal plate 20 has three attachment points 42. The attachment points 42 may be threaded holes 54. The threaded holes 54 receive elongate frame members 44 (e.g., threaded bolts). The threaded holes 42 engaged the threaded portions of the threaded bolts 44. The threaded bolts 44 space the proximal and distal plates 18, 20 from each other so that they 18, 20 remain parallel to each other at a set distance apart from each other during the removal of the pulley 12 off of the shaft 14.

The proximal plate 18 may have two or more attachment points 46 which are through holes 46 formed in the proximal plate 18. Preferably, the proximal plate 18 has the same number of attachment points 46 as the number of attachment points 42 on the distal plate 20. The threaded bolts 44 are fed through the through holes 46 then threadably engaged to the threaded holes 42 formed in the distal plate 20. The proximal plate 18 is capable of sliding along the length of the bolts 44. The threaded bolts 44 are tightened so that the distance 48 between the proximal side 36 of the distal plate 20 and the distal side 50 of the proximal plate is greater than a height 52 of the pulley 12. More particularly, the distance 48 between the proximal side 36 of the distal plate 20 and the distal side 50 of the proximal plate 18 is sufficiently large so that (1) the pulley 12 may fit between the proximal and distal plates 18, 20, (2) the distal portion 26 of the push rod 24 can engage the shaft 14 and (3) a threaded hole 54 of the proximal plate 18 may fully engage threads 56 of the pushrod 24. This means that the distal portion 26 of the push rod 24 is pushed past the threaded hole 54 of the proximal plate 18.

The threaded hole 54 formed in the proximal plate 18 are formed with a recess 58 in the distal side 50 of the proximal plate 18.

Figure 4:
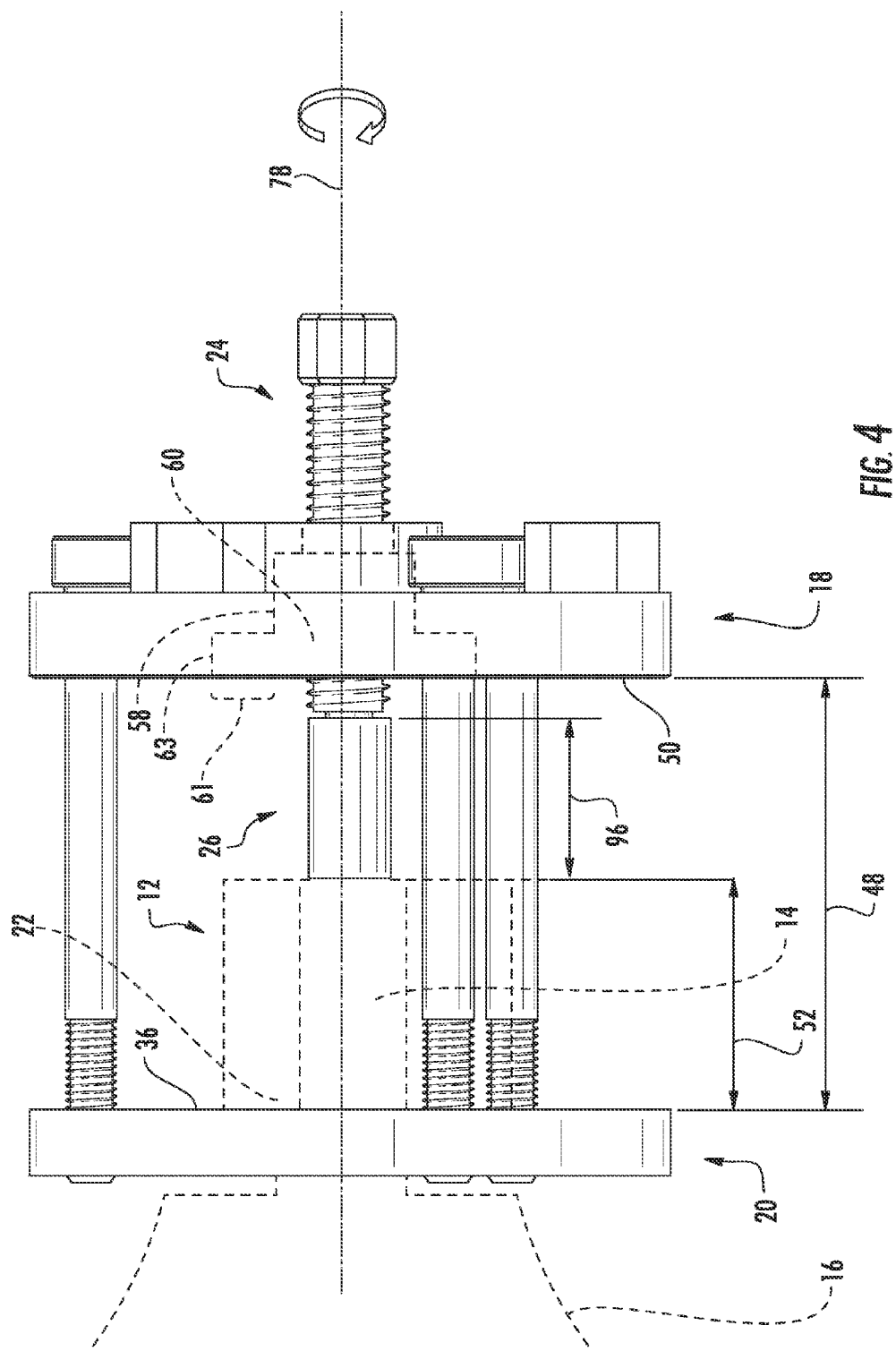
FIG. 4 is a side view of the pulley shown in FIG. 2.
Figure 5:
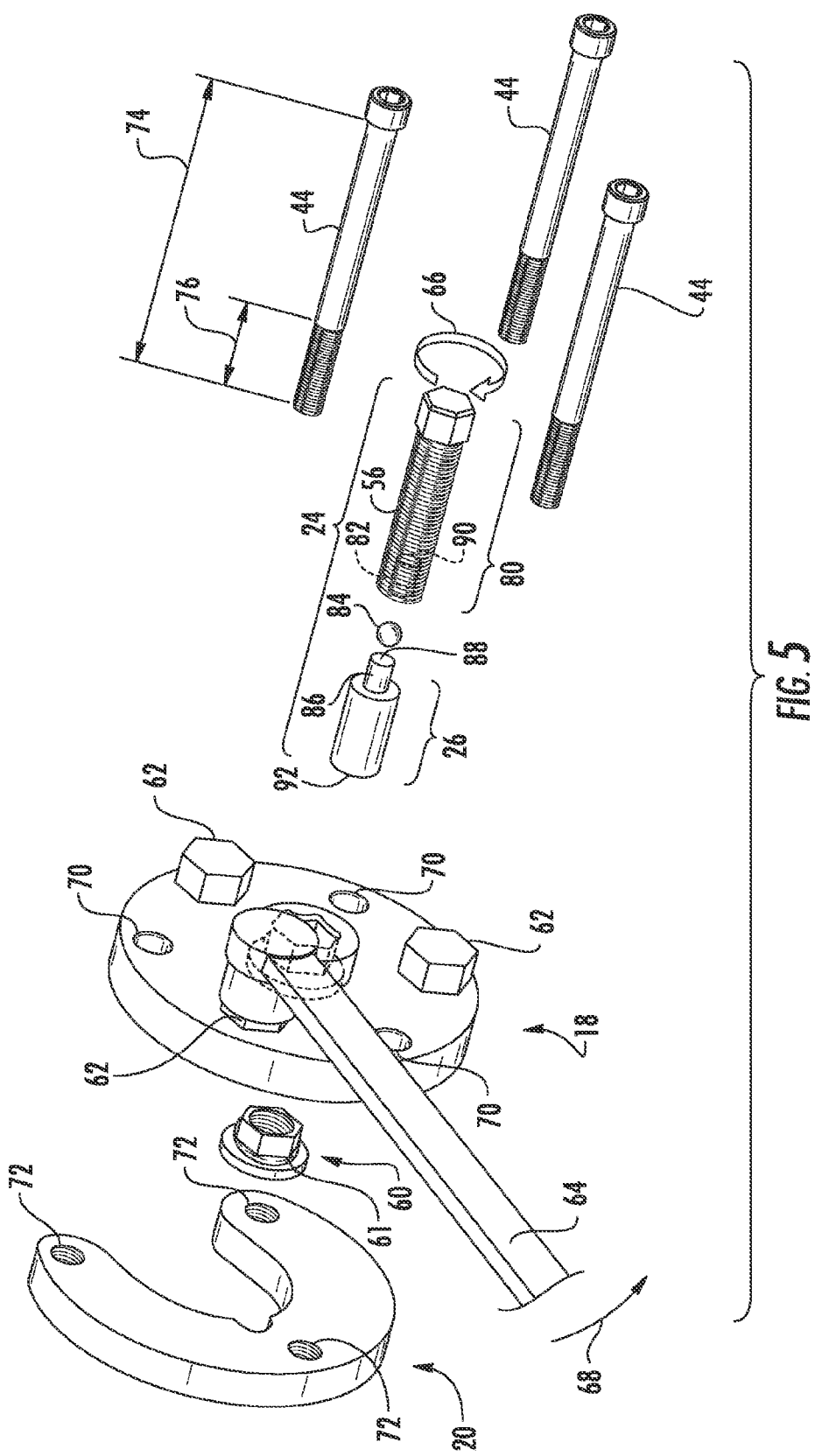
FIG. 5 is an exploded perspective view of the pulley shown in FIG. 2.

The recess 58 is configured to fit a nut 60 which has threads. The nut 60 may be secured in the recess 58 by way of interference fit, welding, adhesive and other attachment methods known in the art or developed in the future. The nut 60 may also have a flange 61 that fits into a corresponding recess 63 formed in the distal side of the proximal plate 18. The recess 63 that fits the flange 61 is shown in FIG. 4. An outer diameter of the flange 61 may have an interference fit with an inner diameter of the recess 63 to secure the nut 60 to the proximal plate 18.

The proximal side of the proximal plate 18 may have one or more mounts 62. These mounts 62 may receive a wrench or breaker bar 64 to hold the puller 10 stationary as the user rotates the push rod 24 in the clockwise direction 66 for pulling the pulley 12 off of the shaft 14. As a user rotates the push rod 24 in the clockwise direction, the user also holds and applies a counterclockwise force 68 to the breaker bar 64. The mount 62 may have a hexagonal configuration so that a wrench with an elongate handle may be utilized as the breaker bar 64. The mount 62 may have other configurations such as square and other shapes to fit other types of wrenches that grip onto the exterior surface of the mount 62. The mount 62 may also have a recess on its proximal side sized and configured to receive a hexagonal wrench or other type of wrenching tools.

The distal and proximal plates 20, 18 may be spaced apart and placed in parallel position to each other with elongate frame members 44. The frame members 44 may be bolts. The bolts 44 are slid through the holes 70 of the proximal plate 18 and threadably engage to the threaded holes 72 of the distal plate 20. A length 74 of the bolt 44 may be sufficiently long so that the pulley 12 may be fully disposed between the distal and proximal plates 20, 18 and also to allow for full threaded engagement between the threads 56 of the push rod 24 and the threaded holes 54 formed in the proximal plate 18. This would also allow for the distal portion 26 of the push rod 24 to be fully disposed between the proximal and distal plates 18, 20. A length 76 of the threads of the bolt 44 is sufficiently long to engage the threaded hole 72 formed in the distal plate 20 and to also adjust the distance 48 between the proximal and distal plates 18, 20. The attachment points 42, 46 are disposed about a central axis 78. In the figures, three attachment points 42, 46 are formed on the distal and proximal plates 20, 18. These three attachment points 42, 46 are angularly spaced apart from each other 120°. It is also contemplated that only two attachment points 42, 46 or four or more attachment points 42, 46 may be incorporated into the puller 10. If only two attachment points 42, 46 are incorporated into the puller 10, then the attachment points 42, 46 are positioned 180° from each other about central axis 78. When three or more attachment points 42, 46 are incorporated into the puller 10, then the attachment points 42, 46 are angularly spaced apart from each other about the central axis 78 in equal angles. By way of example and not limitation, three attachment points 42, 46 are separated from each other at 120° from each other. Four attachment points 42, 46 are separated from each other at 90° from each other.

The push rod 24 pushes upon the shaft 14 holding the pulley 12. As the push rod 24 is threaded into the threaded hole 54 of the proximal plate 18, force is transferred from the push rod 24 to the proximal plate 18, through the frame members 44, to the distal plate 20 and places a force on the distal end 22 of the pulley 12 to force the pulley 12 off of the shaft 14. The push rod 24 may include three components, namely, a threaded portion 80 and the distal portion 26. The distal portion 26 is allowed to rotate independently from the threaded portion 80 so that the distal portion 26 may remain stationary (i.e., not rotating) when the distal portion 26 is engaged to the shaft 14 of the supercharger 16 and the user is rotating the threaded portion 80 of the push rod 24 to further engage the threads 56 of the threaded portion 80 of the push rod 24 into the threaded hole 54 of the proximal plate 18. To this end, the threaded portion 80 may have a recessed cavity 82 formed in the distal end portion of the threaded portion 80 of the push rod 24. A ball bearing 84 may be disposed within the recess cavity 82. The distal portion 26 may have a protrusion 86 that also is received into the recess cavity 82. The ball bearing 84 may rest on the proximal end 88 of the protrusion 86 of the distal portion 26 and an inner end 90. The proximal end 80 and the inner end 90 of the distal portion 26 and the threaded portion 80 are both flat and parallel to each other so that the ball bearing 84 makes a point contact with each of the ends 88, 90. The distal portion 26 has a smaller surface area to the ball bearing 84 compared to the distal end 92 of the distal portion 26 to the shaft 14. As such, when the user rotates the threaded portion 80 in the clockwise direction 66, the distal portion 26 remains stationary on the shaft 14.

To remove the pulley 12 from the shaft 14, the user mounts the puller 10 onto the pulley 12. To do so, the user removes one of the frame members 44 to make space so that the pulley 12 may be disposed between the distal and proximal plates 20, 18. Preferably, one of the frame members 44 closest to the opening 28 formed in the distal plate 20 is removed. In particular, the threads of the frame member 44 may be disengaged from the threaded hole 72 formed in the distal plate 20. The disengaged frame member 44 may be slid out completely or at least partially to allow for the puller 10 to be disposed over the pulley 12. Once the puller 10 is disposed over the pulley, as shown in FIG. 3, the threads of the frame member 44 are reengaged to the threaded hole 72. The engagements of the threads of the frame members 44 to the threaded holes 70 are adjusted so that the proximal plate 18 is parallel to the distal plate 20 during the removal process. In particular, a lower side 94 of a bolt head 96 of the frame members 44 are all disposed within the same plane.

The push rod 24 shown in FIG. 4 may be rotated in the clockwise direction 66 to force the push rod 24 further into the proximal plate 18 so that the distal portion 26 engages the shaft 14 of the supercharger 16. Preferably, when the distal portion 26 contacts the shaft 14, the threads of the threaded portion 80 of the push rod 24 are fully engaged to the threads of the threaded holes 54 of the proximal plate 18. As shown in FIG. 4, the length 48 between the proximal side 36 of the distal plate 20 and the distal side 50 of the proximal plate 18 is equal to or greater than the height 52 of the pulley 12 and a length 96 of the distal portion 26 of the push rod 24.

The user places the breaker bar 64 on one of the mounts 62 and begins to rotate the push rod 24 in the clockwise direction 66 to push the distal portion 26 into the shaft 14. The push rod 24 may be rotated in the clockwise direction 66 by engaging a wrench or other torque producing tool onto a head 98 of the push rod 24. The breaker bar 64 keeps the puller 10 stationary as the wrench turns the push rod 24. The initial stages of removing the pulley 12 from the shaft 14 may be difficult. However upon initial movement of the pulley 12 off of the shaft 14, it is significantly easier to move the pulley 12 off of the shaft 14. As such, after the initial movement of the pulley 12 off of the shaft 14, the user may remove the breaker bar 64 from the mount 62 and use his or her hand to keep the puller 10 stationary by gripping the frame members 44. The user continues to rotate the push rod 24 until the pulley 12 is completely off of the shaft 14. The thread direction of the threaded portion 80 may also be reversed in that instead of following the right-hand rule, the threads of the threaded portion 80 of the push rod 24 follows the left-hand rule. In particular, the push rod 24 is further inserted into the threaded hole 54 of the proximal plate 18 by rotating the threaded portion in the counterclockwise direction.

It is also contemplated that the in-use body of the pulley 12 which is attached to a shaft mount may be replaced with a sacrificial body having a wider distal end 22. In particular, the body of the pulley 12 may be attached to a shaft mount with a plurality of bolts. The shaft mount may be secured to the shaft 14. The body is removably attachable to the shaft mount without removing the shaft mount from the shaft 14. The original, in use, body is removed from the shaft mount by removing the fasteners. The original body is removed and the sacrificial body is then mounted to the shaft mount. The sacrificial body need only have two or more holes in the body for bolting the body to the shaft mount and also the wider distal end 22 in the form of a wider flange. This provides additional leeway or tolerance so that the distal plate 20 may engage the distal end 22 of the pulley 12 in removing the pulley 12 off of the shaft 14. The sacrificial body is used for the purposes of removal only so that the aesthetically pleasing in-use body of the pulley 12 is not damaged during the pulley 12 removal process. The pulley 12 shown and described in relation to the puller 10 is a two part pulley 12. However, the puller 10 may also be used to remove a one part pulley. Additionally, the puller 10 may be used to pull larger and smaller pulleys provided that the puller is sized accordingly.

The above description is given by way of example, and not limitation. Given the above disclosure, one skilled in the art could devise variations that are within the scope and spirit of the invention disclosed herein, including various ways of configuring the proximal an distal plates to accommodate the body of the supercharger. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A puller for removing a pulley mounted to a shaft of a super charger, the puller comprising:
    a distal plate having an opening sufficiently large to receive the shaft and a portion of the super charger where the shaft is mounted to the portion of the supercharger, the opening being smaller than a distal end of the pulley, the distal plate having three attachment points disposable about a central axis of the puller;
    a proximal plate having three attachment points disposable about the central axis of the puller, the attachment points of the proximal plate being in alignment with the attachment points of the distal plate, the proximal plate having a threaded hole axially aligned to the central axis of the puller;
    three elongate frame members defining distal and proximal end portions, the distal end portions of the three frame members attached to the three attachment points of the distal plate, the proximal end portions of the three frame members attached to the three attachment points of the proximal plate;
    a push rod threadably engaged to the threaded hole of the proximal plate, the push rod having a wrench engaging portion for rotating the push rod and a distal portion sized and configured to engage a proximal end of the shaft of the super charger;

wherein clockwise rotation of the push rod traverses the distal portion of the push rod into engagement with the proximal end of the shaft of the super charger and creates an opposing force on the distal end of the pulley with the distal plate to pull the pulley off of the shaft of the super charger;

wherein the threaded hole of the proximal plate comprising a recess formed on a distal side of the proximal plate and an insert with the threaded hole, the insert being retained within the recess.

2. A puller for removing a pulley mounted to a shaft of a super charger, the puller comprising:

a distal plate having an opening sufficiently large to receive the shaft and a portion of the super charger where the shaft is mounted to the portion of the supercharger, the opening being smaller than a distal end of the pulley, the distal plate having three attachment points disposable about a central axis of the puller;

a proximal plate having three attachment points disposable about the central axis of the puller, the attachment points of the proximal plate being in alignment with the attachment points of the distal plate, the proximal plate having a threaded hole axially aligned to the central axis of the puller;

three elongate frame members defining distal and proximal end portions, the distal end portions of the three frame members attached to the three attachment points of the distal plate, the proximal end portions of the three frame members attached to the three attachment points of the proximal plate;

a push rod threadably engaged to the threaded hole of the proximal plate, the push rod having a wrench engaging portion for rotating the push rod and a distal portion sized and configured to engage a proximal end of the shaft of the super charger;

wherein clockwise rotation of the push rod traverses the distal portion of the push rod into engagement with the proximal end of the shaft of the super charger and creates an opposing force on the distal end of the pulley with the distal plate to pull the pulley off of the shaft of the super charger;

wherein the distal portion of the push rod is independently rotatable with respect to the wrench engaging portion.

3. The puller of claim 2 wherein the distal and proximal plates each have three attachment points spaced apart 120 degrees about the central axis.

4. The puller of claim 2 wherein the frame members are bolts, the attachment points of the distal plate are threaded holes engaging a threaded portion of the bolts and the attachment points of the proximal plate are through holes engaging a neck portion of the bolts.

5. The puller of claim 2 wherein one of the frame members closest to the opening of the distal plate is removably attachable to the distal plate.

6. The puller of claim 2 wherein the push rod has a threaded portion, the distal portion and a ball bearing, the ball bearing being disposed between the threaded portion and the distal portion and providing the primary axial force transfer between the threaded portion and the distal portion.

7. The puller of claim 2 further comprising at least one mount formed on a proximal side of the proximal plate, the mount being sized and configured to receive a breaker bar.

8. A method of removing a pulley mounted on a shaft of a supercharger, the method comprising the steps of:

inserting the pulley between proximal and distal plates of a puller;

inserting the shaft and a portion of the super charger where the shaft is mounted into an opening of a distal plate of the puller;

rotating a push rod attached to a proximal plate of the puller;

engaging a distal portion of the push rod with a proximal end of the shaft;

pushing the pulley off of the shaft with the distal plate.

9. The method of claim 8 wherein the pushing step includes the step of applying a force to a distal end of a body of the pulley to remove the pulley off of the shaft.

10. The method of claim 8 further comprising the steps of:

removing an elongate frame member from the distal plate of the puller; and attaching the removed frame member onto the distal plate of the puller.

11. The method of claim 8 further comprising the step of:

maintaining a distal portion of the push rod in a stationary position when the distal portion of the push rod is in contact with the shaft and a threaded portion of the push rod is being rotated.

* * * * *